United States Patent [19]

Larson et al.

[11] Patent Number: 4,804,211
[45] Date of Patent: Feb. 14, 1989

[54] SEAL ASSEMBLY

[75] Inventors: Donald J. Larson, Hinsdale; Norman L. Moore, Allegany, both of N.Y.

[73] Assignee: Dresser-Rand Company, Corning, N.Y.

[21] Appl. No.: 124,340

[22] Filed: Nov. 20, 1987

Related U.S. Application Data

[63] Continuation of Ser. No. 904,525, Sep. 5, 1986, abandoned.

[51] Int. Cl.⁴ .................... F16D 3/84; F16L 27/10
[52] U.S. Cl. ...................... 285/225; 285/223; 464/170; 464/177
[58] Field of Search ............... 277/212 FB; 285/225, 285/57, 224, 223; 403/220, 225, 226; 464/173, 177, 170

[56]  References Cited

U.S. PATENT DOCUMENTS

| | | | |
|---|---|---|---|
| 273,929 | 3/1883 | Woodruff | 285/225 X |
| 367,516 | 8/1887 | Coubert | 285/225 X |
| 2,051,085 | 8/1936 | Ilseman | |
| 2,083,967 | 6/1937 | Symonds | |
| 2,113,047 | 4/1938 | French | 285/225 X |
| 2,276,221 | 3/1942 | Magnesen | 285/225 X |
| 3,207,539 | 9/1965 | Hackforth | 403/225 |
| 3,246,917 | 4/1966 | Martin | 285/225 X |
| 3,582,096 | 6/1971 | Norton et al. | |
| 3,669,471 | 6/1972 | Fetish, Jr. | 285/225 X |
| 3,970,333 | 7/1976 | Pelzer | 285/224 X |
| 4,217,767 | 8/1980 | Eckley | |

FOREIGN PATENT DOCUMENTS

| | | | |
|---|---|---|---|
| 191287 | 1/1967 | U.S.S.R. | 285/225 |
| 739267 | 10/1955 | United Kingdom | 285/225 |

OTHER PUBLICATIONS

Dresser Clark Division Drawing, 468-800, as can be seen by the drawing identified as section A—A.

Primary Examiner—Allan N. Shoap

[57] ABSTRACT

A seal assembly is provided for preventing excessive movement between two housings. Whenever two rotating shafts are coupled together, one shaft driving the other, there is generally some movement of the shafts and their respective machines relative to each other. It is preferable to cover the rotating shafts for safety and to provide lubrication. A flexible membrane is attached between a coupling guard adapter which is rigidly mounted to the housing of one piece of equipment, and a back-up ring. This assembly is then attached to a coupling guard which is itself rigidly mounted to a housing on the other piece of equipment. Finally, a membrane guard is attached to the coupling guard.

2 Claims, 1 Drawing Sheet

SEAL ASSEMBLY

This application is a continuation of application Ser. No. 904,525, filed 9/5/86, abandoned.

TECHNICAL FIELD

This invention relates generally to shaft coupling guards, and more particularly to apparatus for providing a seal assembly that is both oil tight and flexible.

BACKGROUND OF THE INVENTION

The coupling together of a driving shaft and a driven shaft has long been practiced. Due to various factors such as thermal expansion, equipment vibration, and torque the shafts and their respective pieces of equipment tend to move relative to each other. Since it is desirable to cover (or house) the coupled shafts and/or any gear boxes between them for safety and lubrication it is necessary to have a fluid tight seal between the cover and the equipment.

Previous designs have consisted of placing a gasket between the cover and the piece of equipment such as can been seen at 42 in U.S. Pat. No. 4,217,767 to Eckley. A design, such as Eckley, makes no allowance for axial or radial movement. If the machines move axially, the gasket 42 can be damaged or even wedged into the gap it seals, thus eventually allowing lubricant leakage. If the machines move radially, face sealing means 40 tends to prevent this movement, creating excessive machine stress. Therefore, there is a need for a device that will prevent leakage as well as allow for relative movement of the pieces of equipment.

SUMMARY OF THE INVENTION

The present invention is a seal assembly designed to allow relative movement of two pieces of equipment within the limitations of a flexible membrane. A flexible membrane, such as one constructed of fiber-reinforced gasket material, is placed at its inside diameter between a coupling guard adapter which is rigidly attached to the housing of one piece of equipment and a back-up ring. This assembly thus formed is then attached to a coupling guard at the flexible membrane's outside diameter. The coupling guard is rigidly attached to the housing of the other piece of equipment. A membrane guard is then secured to the flexible membrane, at its outside diameter, and the coupling guard.

The membrane guard is constructed of a metallic substance. It is formed into a disk shape having an outside diameter equal to the outside diameter of the coupling guard and an inside diameter slightly greater than the outside diameter of the coupling guard adapter. The device is better defined from a cross-sectional perspective. Viewed from a cross-sectional perspective, the flexible membrane guard has a cylindrical portion and a motion limiting portion. The motion limiting portion forms a continuous surface perpendicular to and extending radially inward from one end of the cylindrical portion. At its radially innermost end the motion limiting portion has an axial thickness less than the axial thickness of the cylindrical portion.

BRIEF DESCRIPTION OF THE DRAWINGS

For a more complete understanding of the present invention and for further advantages thereof, reference is now made to the following Description of Preferred Embodiment taken in conjunction with the accompanying Drawings, in which.

DETAILED DESCRIPTION

Figure 1:
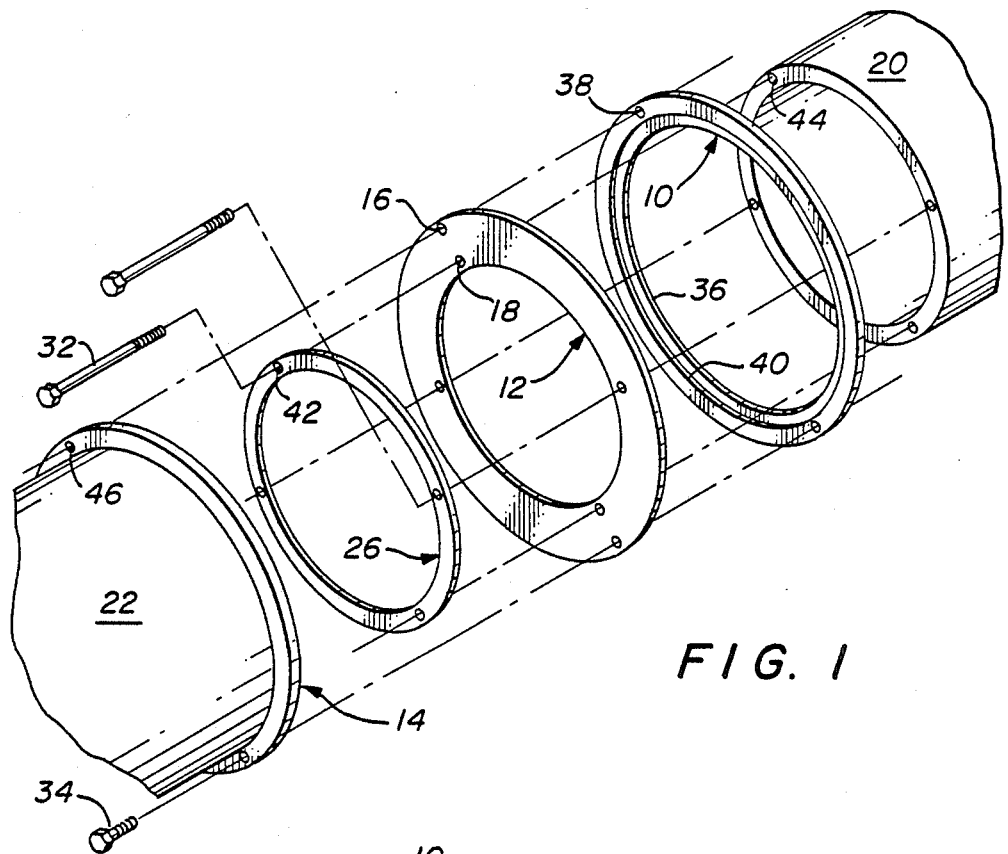
FIG. 1 is an exploded diagram of the present invention showing the seal assembly.

FIG. 1 shows an exploded view of the present invention. Rigid annular membrane guard 10 is slipped over annular coupling guard adapter 20. Annular flexible membrane 12 is then placed so that inside diameter bolt holes 18 line up with the bolt holes 44 on annular coupling guard adapter 20. Annular back-up ring 26 is then placed so that bolt holes 42 line up with inside diameter bolt holes 18 on annular flexible membrane 12 and bolt holes 44 on annular coupling guard adapter 20. Bolts 32 are then placed through bolt holes 42, 18, and 44 to rigidly secure annular back-up ring 26, annular flexible membrane 12, and annular coupling guard adapter 20 to a first housing 24 (see FIG. 2).

Figure 2:
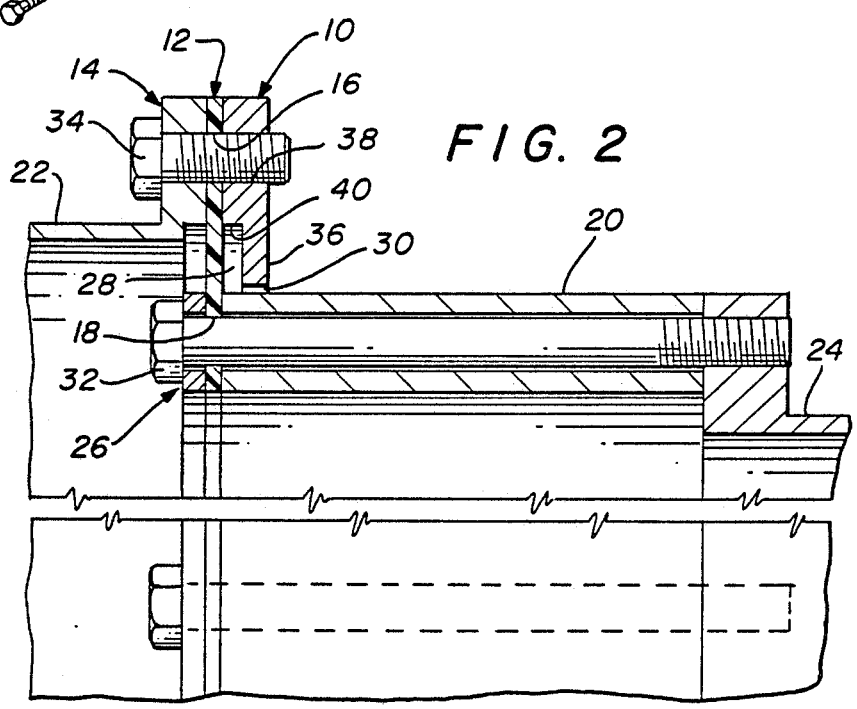
FIG. 2 is a partial cross-sectional view of the seal assembly.

Bolts 34 are then placed through bolt holes 46 in annular coupling guard 14, outside diameter bolt holes 16 on annular flexible membrane 12, and bolt holes 38 on rigid annular membrane guard 10 to secure this assembly to second housing 22 (see FIG. 2).

Referring now to FIG. 2, it can be seen that an annular gap 28 is formed by rigid annular membrane guard 10 and annular flexible membrane 12. Annular gap 28 allows for deflection of annular flexible membrane 12 due to movement in any direction by second housing 22 and first housing 24. A radial gap 30 is also formed by rigid annular membrane guard 10 and annular coupling guard adapter 20. Radial gap 30 is to allow movement of second housing 22 and/or first housing 24 in a radial direction and to restrict this movement to the flexible limits of annular flexible membrane 12.

As can be seen in FIG. 2, rigid annular membrane guard 10 has a cylindrical portion 40 and a motion limiting portion 36. Motion limiting portion 36 forms a continuous surface perpendicular to and extending radially inwardly from cylindrical portion 40. Motion limiting portion 36 has a uniform axial thickness throughout its radial length less than the axial thickness of cylindrical portion 40. This difference in axial thickness forms annular gap 28.

Although the present invention has been described with respect to a specific embodiment thereof, various changes and modifications may be suggested to one skilled in the art, and it is intended that the present invention encompass such changes and modifications as fall within the scope of the appended claims.

We claim:

1. A flexible seal assembly for joining a first and second housing that cover a driving and a driven shaft connected therebetween, comprising:
    an annular coupling guard adapter having an inside and an outside diameter and being rigidly mounted to the first housing;
    an annular coupling guard having an inside diameter greater than the outside diameter of said annular coupling guard adapter and an outside diameter, said annular coupling guard being rigidly mounted to the second housing;
    a rigid membrane guard disposed adjacent said annular coupling guard adapter and including first and second parallel surfaces spaced apart by a first cylindrical portion and a second cylindrical portion, said first cylindrical portion and said second cylindrical portion being spaced apart by a third surface located between and parallel to said first and second surfaces;

said first surface of said rigid membrane guard defining an annular ring having an inner and outer diameter, corresponding to the inner and outer diameter of said annular coupling guard for attachment to said annular coupling guard;

said second surface of said rigid membrane guard defining an annular ring having an inner and outer diameter, said outer diameter corresponding to the outer diameter of said annular coupling guard and said inner diameter corresponding to the diameter of said second cylindrical surface and being greater than the outer diameter of said annular coupling guard adapter and being radially spaced apart from said annular coupling guard adapter to thereby define a first radial gap between said rigid membrane guard and said annular coupling guard adapter to allow radial movement between the first and second housings;

said first cylindrical portion of said rigid membrane guard being perpendicularly disposed to said first and said third surfaces and having a diameter corresponding to the inner diameter of said annular coupling guard and located between the second cylindrical portion and said first surface, the diameter of said first cylindrical portion being greater than the diameter of said second cylindrical portion to thereby define a second radial gap therebetween, said second radial gap being of greater cross-sectional area than said first radial gap; and an annular flexible membrane disposed between said first surface of said rigid membrane guard and said annular coupling guard, said second radial gap being located on a first side of said membrane and being adjacent said first radial gap, said annular flexible membrane having an inner and outer diameter, said inner diameter corresponding to the inner diameter of said annular coupling guard adapter and said outer diameter corresponding to the outer diameter of said annular coupling guard, such that said annular flexible membrane passes between said second radial gap and a corresponding gap on a second side of said membrane adjacent to the annular coupling guard and provides a leakproof seal between the coupling guard and the coupling guard adapter, and a portion of said annular gap being maintained between said annular flexible membrane and said second surface of said rigid membrane guard thereby allowing said annular flexible membrane to deflect due to relative lateral movement between the first and second housings.

2. The seal assembly of claim 1 and further including:

an annular backup ring disposed between the second housing and said annular flexible membrane and being attached to said coupling guard adapter and said annular flexible membrane.

* * * * *